(12) United States Patent
Miller et al.

(10) Patent No.: US 6,749,197 B1
(45) Date of Patent: Jun. 15, 2004

(54) STEP GARNISH AND STEP GARNISH CONNECTION ASSEMBLY

(75) Inventors: Ryan Miller, Columbus, OH (US); Douglas McLeish, Powell, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 57 days.

(21) Appl. No.: 10/330,996

(22) Filed: Dec. 27, 2002

(51) Int. Cl.[7] ............................................... B60R 19/44
(52) U.S. Cl. ...................................... 273/117; 273/155
(58) Field of Search ................................ 273/117, 142, 273/144, 145, 155

(56) References Cited

U.S. PATENT DOCUMENTS

| | | | | |
|---|---|---|---|---|
| 3,501,170 A | * | 3/1970 | De Valle | |
| 3,606,385 A | * | 9/1971 | Johannes | |
| 3,614,136 A | * | 10/1971 | Dent | 293/69 |
| 4,695,084 A | * | 9/1987 | Hlavach | 293/126 |
| 4,753,467 A | * | 6/1988 | DeCaluwe et al. | 293/155 |
| 4,875,728 A | * | 10/1989 | Copp et al. | 293/142 |
| 5,022,692 A | * | 6/1991 | Horansky et al. | 293/128 |
| 5,364,142 A | * | 11/1994 | Coiner | 293/117 |
| 6,196,612 B1 | * | 3/2001 | Grimes | 293/117 |
| 6,425,624 B1 | * | 7/2002 | Kurek et al. | 293/155 |

* cited by examiner

*Primary Examiner*—D. Glenn Dayoan
*Assistant Examiner*—Hillary Gutman
(74) *Attorney, Agent, or Firm*—Rankin, Hill, Porter & Clark LLP; Mark E. Duell

(57) ABSTRACT

A step garnish is attached to a rear bumper via a plurality of connectors that are adapted to reduce or eliminate damage to a tailgate in the event of a rear impact. The connectors include first connectors that releasably secure a proximal end of the step garnish to a top portion of the bumper body, and second connectors that affix a distal end of the step garnish to the bumper body top portion. In the event of a rear impact, the proximal end of the step garnish is released from the bumper while the distal end of the step garnish remains attached to the bumper body. Accordingly, the step garnish moves up away from damaging contact with the tailgate.

20 Claims, 2 Drawing Sheets

STEP GARNISH AND STEP GARNISH CONNECTION ASSEMBLY

BACKGROUND OF THE INVENTION

1. Field of the Invention

The present invention is generally directed toward a rear bumper assembly and, more particularly, toward a step garnish for use in a rear bumper assembly.

2. Description of Related Art

In vehicles having a rear tailgate, such as minivans and sport utility vehicles, the rear bumper is disposed rearwardly and slightly below the rear tailgate. The rear bumper typically has a step garnish or cover plate secured thereto. The step garnish is integrally or fixedly secured to the bumper by connectors, and serves to provide a clean, durable, non-slip surface for the top of the bumper. As such, the step garnishes known in the art work satisfactorily and have been readily accepted in the art.

Unfortunately, when the vehicle incorporating the rear bumper and step garnish is involved in a rear-end impact, the garnish is trapped between the bumper and the tailgate, and is then driven into the tailgate, and causes damage or denting of the tailgate. Such tailgate damage may occur even in low speed rear impacts wherein the bumper and step garnish survives with minimal or no damage. Accordingly, there exists a need in the art for an improved step garnish and step garnish connection means wherein damage to the tailgate is reduced or avoided entirely when the vehicle is involved in a rear impact.

SUMMARY OF THE INVENTION

The present invention is directed toward an improved step garnish and step garnish connection assembly that reduces or eliminates damage to the tailgate in the event of a rear impact.

In accordance with the present invention, a step garnish is connected to a bumper by a plurality of connectors, including a plurality of first connectors and a plurality of second connectors. The first connectors integrally extend from the step garnish near a proximal end of the step garnish and are disposed a first distance from the vehicle tailgate. The second connectors integrally extend from the step garnish near a distal end of the step garnish and are disposed a second distance from the vehicle tailgate. Thus, the first connectors are relatively closer to the vehicle tailgate than the second connectors, and the second connectors are relatively closer to the bumper distal or rearward end than the first connectors.

In further accordance with the present invention, the first connectors are designed and adapted to release the proximal end of the step garnish when the vehicle experiences a rear impact. The second connectors are designed and adapted to keep the distal end of the step garnish attached to the bumper in the event of a rear end impact. Therefore, during a rear impact the step garnish flips vertically away from the bumper, and thereby does not contact the rear tailgate.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
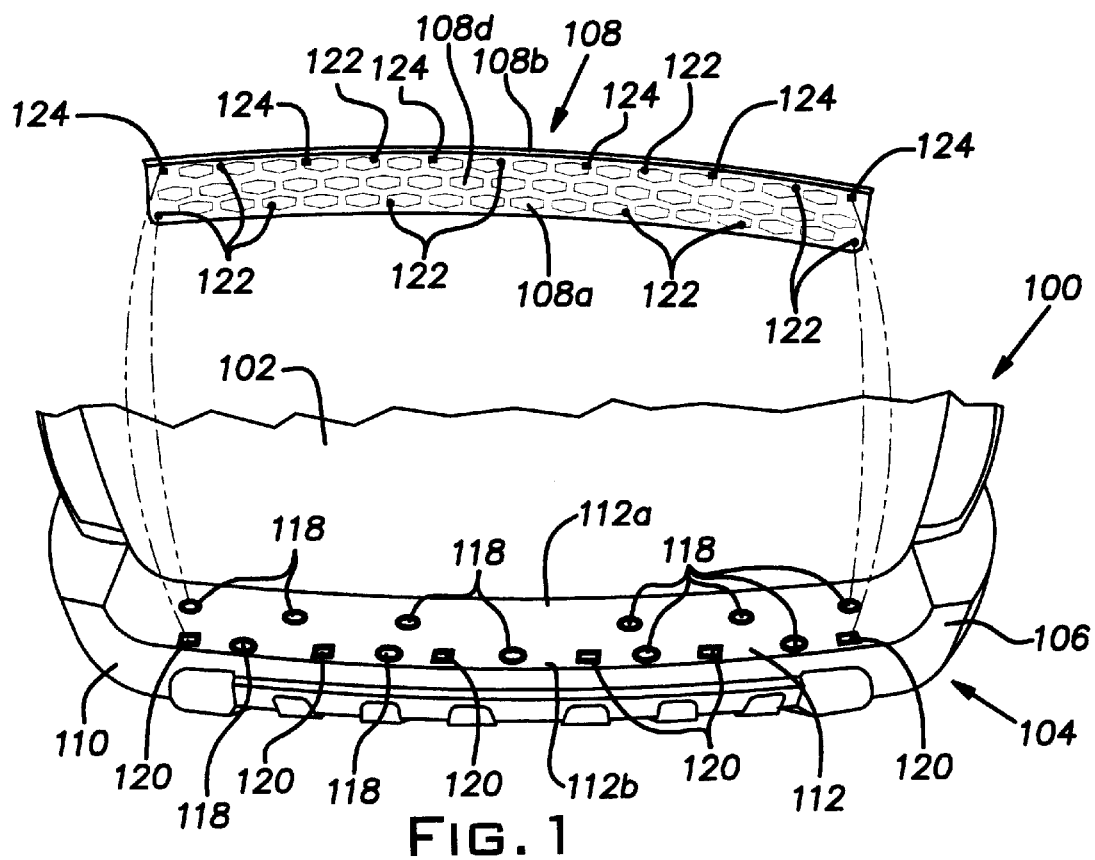
FIG. 1 is an exploded perspective view of a rear bumper and tailgate assembly of a vehicle incorporating the present invention.

With reference to the drawing figures, a rear portion of a vehicle 100 is shown to include a tailgate 102 and a bumper assembly 104. The bumper assembly 104 includes a bumper body 106, a step garnish 108, and internal bumper components that serve to secure the bumper assembly 104 to the vehicle 100, and to support the bumper body 106. Insofar as the bumper internal components are known in the art and do not form part of the present invention, they will not be discussed further hereinafter.

The bumper body 106 is preferably injection-molded, and integrally includes a vertically oriented face portion 110, and a horizontally oriented top portion 112. The top portion 112 has a proximal end 112a that is disposed at a location that is vertically beneath the tailgate 102 when the tailgate 102 is in a closed position. The top portion 112 also has plurality of openings formed therein that receive first and second grommets 118, 120. The first and second grommets 118, 120 are adapted to receive first and second connectors 122, 124, respectively, to secure the step garnish 108 to the bumper body 106, as will be apparent from the following discussion.

A plurality of the first grommets 118 are disposed in the top portion 112 of the bumper body 106 adjacent the proximal end 112a thereof. Similarly, a plurality of first and second grommets 118, 120 are disposed in the top portion 112 of the bumper body adjacent the distal end 112b thereof. As illustrated, the first and second grommets 118, 120 are disposed in an alternating pattern at the distal end 112b of the bumper body top portion 112.

The step garnish 108 is preferably formed from a flexible, slip-resistant material, such as rubber or a rubber-like material, and includes a proximal end 108a adjacent the tailgate 102 and a distal end 108b adjacent the bumper body face portion 110. More specifically, the step garnish proximal end 108a is spaced a short distance from the bottom of the tailgate 102 so as to define a small gap therebetween.

The plurality of first and second connectors 122, 124 are integral with the step garnish 108 and serve to secure the step garnish 108 to the bumper body top portion 112. The connectors 122, 124 are preferably formed via injection molding, and may be insert molded into the step garnish 108 or, alternatively, the connectors 122, 124 may be separately formed from the step garnish 108 and subsequently integrally connected thereto by adhesive bonding techniques, which are well known in the art. In any event, the connectors 122, 124 may be considered to be integral with the step garnish 108.

Accordingly, the step garnish 108 has an upper side 108c and a lower side 108d, and the plurality of connectors 122, 124 extend away from the step garnish lower side 108d. A plurality of the first connectors 122 are disposed generally closer to a proximal end 108a of the step garnish. In the illustrated embodiment, six proximally disposed first connectors 122 are provided. A plurality of the first and second connectors 122, 124 are disposed generally closer to the step garnish distal end 108b in an alternating pattern, as illustrated. In the illustrated embodiment, six distally disposed second connectors 124 and five distally disposed first connectors 122 are provided. Naturally, relatively more or less proximally and distally disposed connectors 122, 124 may be used without departing from the scope and spirit of the present invention.

The first connectors 122 are pin-type connectors and extend through the first grommets 118 received in the bumper body 106. The first connectors 122 include first and second arms 122a, 122b that extend away from a base stem 122c that is integrally secured to the lower side 108d of the step garnish 108. Each of the arms 122a, 122b have a curved outer surface to facilitate insertion of the first connectors 122 into the first grommets 118. The arms 122a, 122b are flexible and adapted to move toward one another during insertion into and removal from the first grommets 118. The curved outer surfaces provide limited resistance to removal of the arms 122a, 122b from the first grommets 118 that is overcome when the bumper top portion 112 bends or bows upwardly during a rear impact, as will be described hereinafter.

Figure 2:
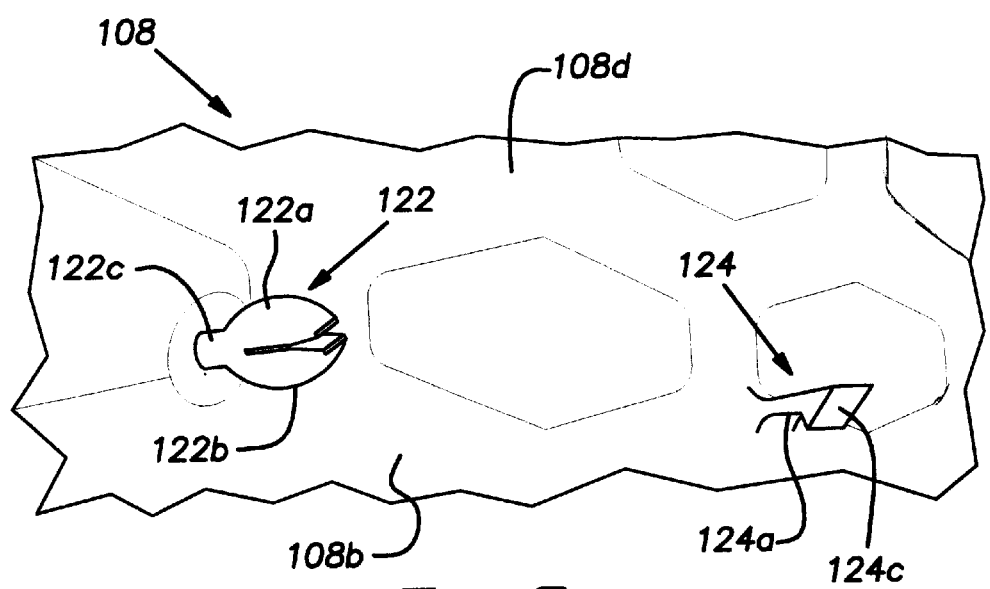
FIG. 2 is an enlarged view showing second connectors used to secure a distal portion of the step garnish to the bumper according to the present invention.

The second connectors 124 are snap-in type bayonet connectors that extend through the second grommets 120. More specifically, and with reference to FIG. 2, each of the second connectors 124 have an arm 124a that integrally extends from the lower side 108d of the step garnish 108. The arm 124a has a hooked distal end 124c that faces forwardly or toward the rear tailgate 102. The hooked end 124c of the arm snaps under a surface of the associated second grommet 120 so as to secure the second connector 124 to the second grommet 120. The sharp edge proved by the hooked end 124c requires a relatively high pull out force for removal from the second grommets 120. The arms 124a are flexible in that they are adapted to bend relatively rearwardly as the arms 124a are pushed into the second grommets 120.

Accordingly, the first connectors 122 are disposed at the proximal end 108a of the step garnish 108 that is relatively close to the tailgate 102. The first connectors 122, while securing the proximal end 108a of the step garnish 108 to the bumper body 106, are designed to release the step garnish 108 from the bumper body 106 in the event of a rear impact.

The second connectors 124 are disposed on the portion 108b of the step garnish 108 that is relatively close to the distal end 112b of the bumper body top portion 112, and are relatively far away from the tailgate 102. The second connectors 124 securely affix the step garnish distal end 108b to the bumper body top portion 112 such that, even during a rear impact, the second connectors 124 remain received within the second grommets 120 and attached to the bumper body 106. As noted hereinbefore, some of the first connectors 122 are also preferably disposed in a portion of the step garnish that is relatively far from the tailgate (i.e., interposed between adjacent second connectors 124). While these distally-located first connectors 122 are also adapted to release from the bumper body 106, they typically only partially release due to their proximity to the second connectors 124. However, providing first connectors 122 at the distal end of the step garnish permits the step garnish to bow or bend upwardly between the fixed second connectors 124, and thereby facilitates movement of the step garnish 108 relative to the bumper body top portion 112 during a rear impact.

Figure 3:
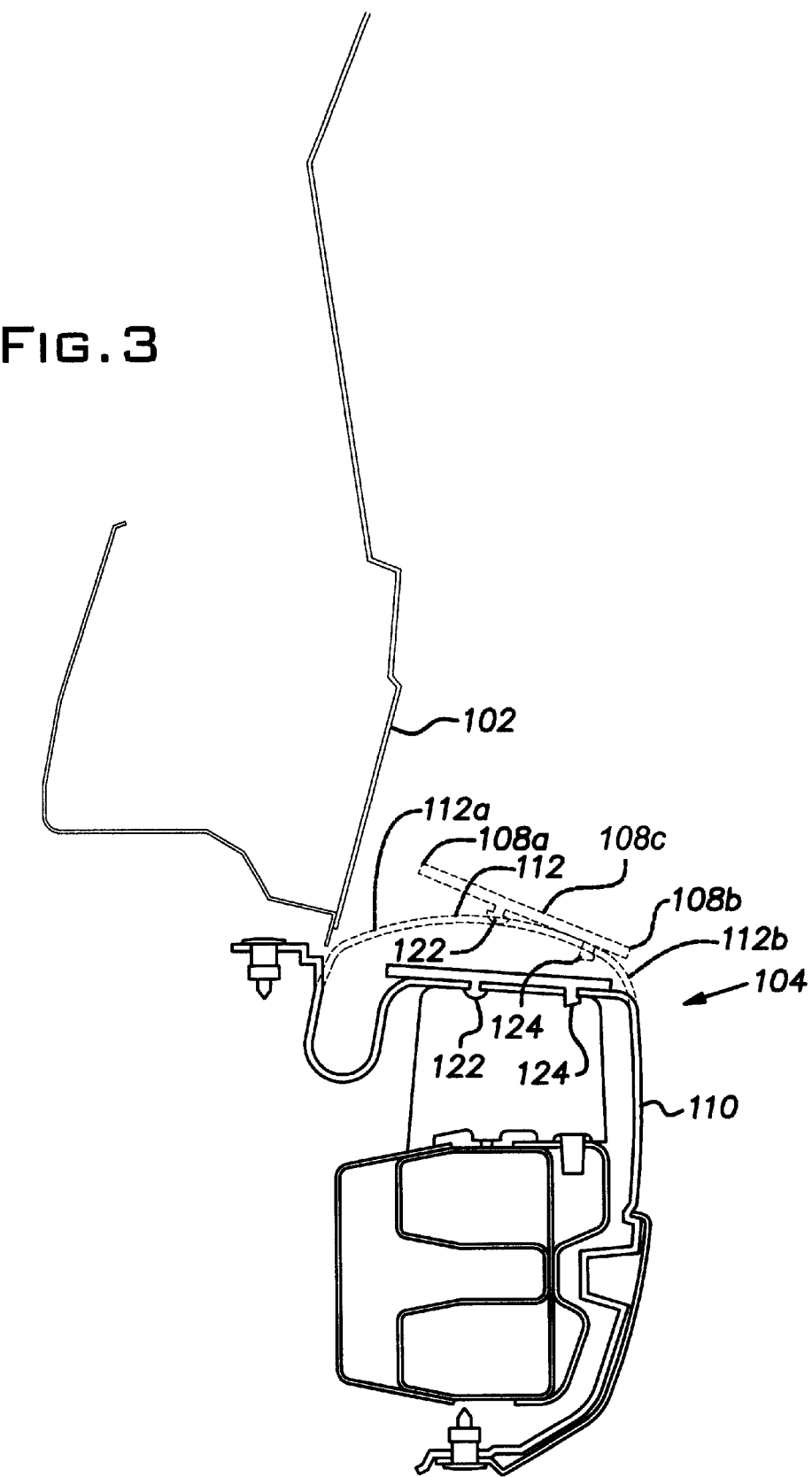
FIG. 3 schematically illustrates release of the step garnish proximal portion during a rear impact.

Accordingly, and with reference to FIG. 3, when the rear bumper assembly 104 is involved in an impact, the rear bumper body 106 is driven forwardly toward the tailgate 102. More specifically, the bumper body face portion 110 is moved forwardly while the top portion 112 of the bumper body 106, which is trapped at its proximal end, deforms or bows upwardly so as to define a curved or upwardly convex shape. The second connectors 124 are retained in the second grommets 120 and therefore remain affixed to the deformed top portion 112 of the bumper body 106. The distally disposed first connectors 122 may move vertically within the associated first grommets 118 should the distal end of the step garnish 108 bow or buckle, but tend to not completely disconnect from the first grommets 118 due to their proximity With the retained second connectors 124.

However, the first connectors 122 at the proximal end of the step garnish 108 release or pop out of the associated first grommets 118 so as to disconnect the proximal end 108a of the step garnish 108 from the top portion 112 of the bumper body 106. Accordingly, during a rear impact the proximal end 108a of the step garnish 108 is released from the bumper body 106, and is free to rotate or move upwardly and outwardly away from the bumper assembly 104 and tailgate 102 under the influence of the deformed bumper body top portion 112. Therefore, the proximal end 108a of the step garnish 108 does not contact the tailgate 102, and damage to the tailgate 102 from the step garnish 108 during a rear impact is avoided.

While the preferred embodiment of the present invention has been disclosed herein with particularity, it is considered apparent that the present invention is not limited thereto. Rather, the present invention is capable of numerous modifications, rearrangements, and replacements of parts without departing from the scope and spirit of the present invention. For example, the specifically illustrated first and second connectors may be replaced by other connectors that serve to releasably secure the proximal end of the step garnish to the bumper body while fixedly securing the distal end of the step garnish to the bumper body. Further, while the distally disposed first connectors 122 are preferably included, they may be omitted or replaced by further second connectors 124. Accordingly, the present invention is only to be defined by the claims appended hereto.

What is claimed is:

1. A rear bumper assembly, comprising:
    a bumper body having a top portion and a face portion, said top portion having a proximal end and a distal end, said distal end being disposed adjacent said bumper body face portion; and,
    a step garnish comprising a plurality of connectors that secure the step garnish to the bumper body top portion;
    wherein said plurality of connectors include first connectors and second connectors, and wherein, in the event of a rear impact on said rear bumper assembly, said second connectors remain connected to said bumper body top portion while said first connectors are released from said bumper body top portion to thereby permit said step garnish to move relative to said bumper body top portion.

2. The rear bumper assembly according to claim 1, wherein said bumper body top portion has a plurality of openings formed therein that receive first grommets and second grommets, said first grommets being spaced a first distance from said top portion proximal end and said second grommets being spaced a second distance from said top portion proximal end, said second distance being greater than said first distance.

3. The rear bumper assembly according to claim 2, wherein said first connectors are received in said first grommets and said second connectors are received in said second grommets.

4. The rear bumper assembly according to claim 3, wherein said first connectors are pin-type connectors.

5. The rear bumper assembly according to claim 4, wherein each of said first connectors comprises first and second arms that extend away from a base stem that is integrally secured to a bottom side of said step garnish, each of said first and second arms having a curved outer surface to facilitate insertion of each of the first connectors into the first grommets, each of said arms being flexible and adapted to move toward one another during insertion into and removal from said first grommets.

6. The rear bumper assembly according to claim 3, wherein said second connectors are snap-in type bayonet connectors that extend through the second grommets.

7. The rear bumper assembly according to claim 6, wherein each of said second connectors comprises an arm that integrally extends from a bottom surface of said step garnish, said arm having a hooked distal end that snaps under a surface of the associated second grommet so as to secure each said second connector to one of the second grommets.

8. The rear bumper assembly according to claim 7, wherein said first connectors are pin-type connectors.

9. The rear bumper assembly according to claim 8, wherein each of said first connectors comprises first and second arms that extend away from a base stem that is integrally secured to a bottom side of said step garnish, each of said first and second arms having a curved outer surface to facilitate insertion of each of the first connectors into the first grommets, each of said arms being flexible and adapted to move toward one another during insertion into and removal from said first grommets.

10. A rear bumper assembly, comprising:
   a bumper body having a top portion and a face portion, said top portion having a proximal end and a distal end, said distal end being disposed adjacent said bumper body face portion; and,
   a step garnish comprising a plurality of connectors that secure the step garnish to the bumper body top portion, said step garnish including a proximal end and a distal end, said step garnish proximal end being adjacent said bumper body top portion proximal end and said step garnish distal end being adjacent said bumper body top portion distal end;
   wherein said plurality of connectors include first connectors and second connectors, a first group of said plurality of first connectors extending from said step garnish proximal end while said plurality of second connectors and a second group of said plurality of first connectors extend from said step garnish distal end, and wherein, in the event of a rear impact on said rear bumper assembly, said second connectors remain connected to said bumper body top portion while said first group of said plurality of first connectors at said step garnish proximal end are released from said bumper body top portion to thereby permit said step garnish proximal end to move relative to said bumper body top portion.

11. The rear bumper assembly according to claim 10, wherein said bumper body top portion has a plurality of openings formed therein that receive first grommets and second grommets, at least some of said first grommets being spaced a first distance from said top portion proximal end and said second grommets being spaced a second distance from said top portion proximal end, said second distance being greater than said first distance.

12. The rear bumper assembly according to claim 11, wherein said first connectors are received in said first grommets and said second connectors are received in said second grommets.

13. The rear bumper assembly according to claim 12, wherein said first connectors are pin-type connectors.

14. The rear bumper assembly according to claim 13, wherein each of said first connectors comprises first and second arms that extend away from a base stem that is integrally secured to a bottom side of said step garnish, each of said first and second arms having a curved outer surface to facilitate insertion of each of the first connectors into the first grommets, each of said arms being flexible and adapted to move toward one another during insertion into and removal from said first grommets.

15. The rear bumper assembly according to claim 12, wherein said second connectors are snap-in type bayonet connectors that extend through the second grommets.

16. The rear bumper assembly according to claim 15, wherein each of said second connectors comprises an arm that integrally extends from a bottom surface of said step garnish, said arm having a hooked distal end that snaps under a surface of the associated second grommet so as to secure each said second connector to one of the second grommets.

17. The rear bumper assembly according to claim 16, wherein said first connectors are pin-type connectors.

18. The rear bumper assembly according to claim 17, wherein each of said first connectors comprises first and second arms that extend away from a base stem that is integrally secured to a bottom side of said step garnish, each of said first and second arms having a curved outer surface to facilitate insertion of each of the first connectors into the first grommets, each of said arms being flexible and adapted to move toward one another during insertion into and removal from said first grommets.

19. A method for preventing damaging contact between a step garnish and a tailgate in the event of a rear impact experienced by a rear bumper upon which the step garnish is disposed, comprising the steps of:
   attaching the step garnish to the rear bumper with first connectors and second connectors, said first connectors extending from said step garnish adjacent a proximal end of said step garnish and said second connectors extending from said step garnish adjacent a distal end of said step garnish;
   wherein, during the rear impact, said first connectors are adapted to release said step garnish proximal end from said rear bumper while said second connectors are adapted to maintain said step garnish connected to said rear bumper such that said step garnish proximal end may move relative to the rear bumper.

20. The method according to claim 19, wherein, when said step garnish proximal end moves relative to said rear bumper, said garnish distal end remains substantially affixed and stationary relative to said rear bumper.

* * * * *